Figure 1:
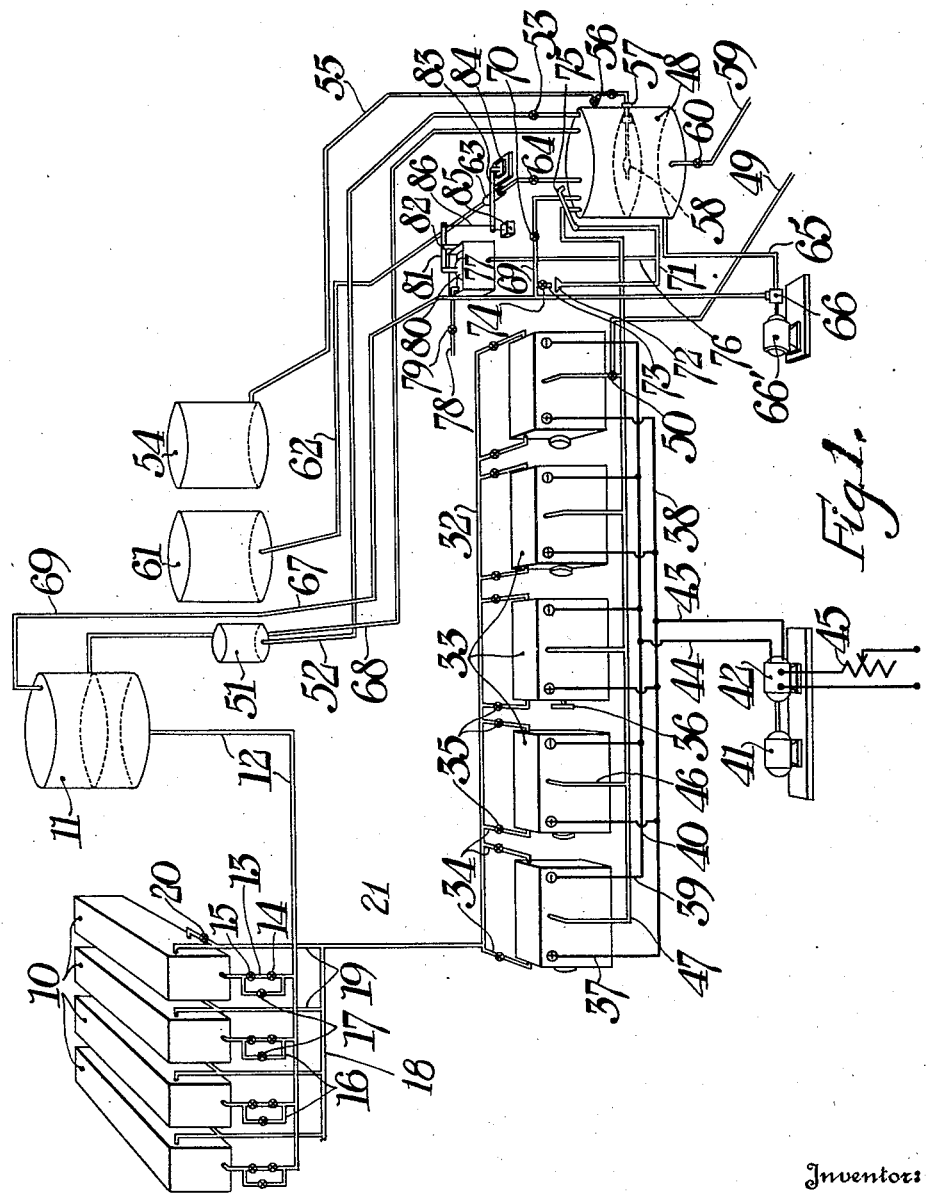

Jan. 9, 1934.  K. C. D. HICKMAN  1,942,859
LIQUID CONCENTRATION CONTROL APPARATUS
Original Filed June 4, 1931  2 Sheets-Sheet 1

Inventor:
Kenneth C.D.Hickman,
By Newton N. Perrins.
George A. Gillette, Jr.
Attorneys

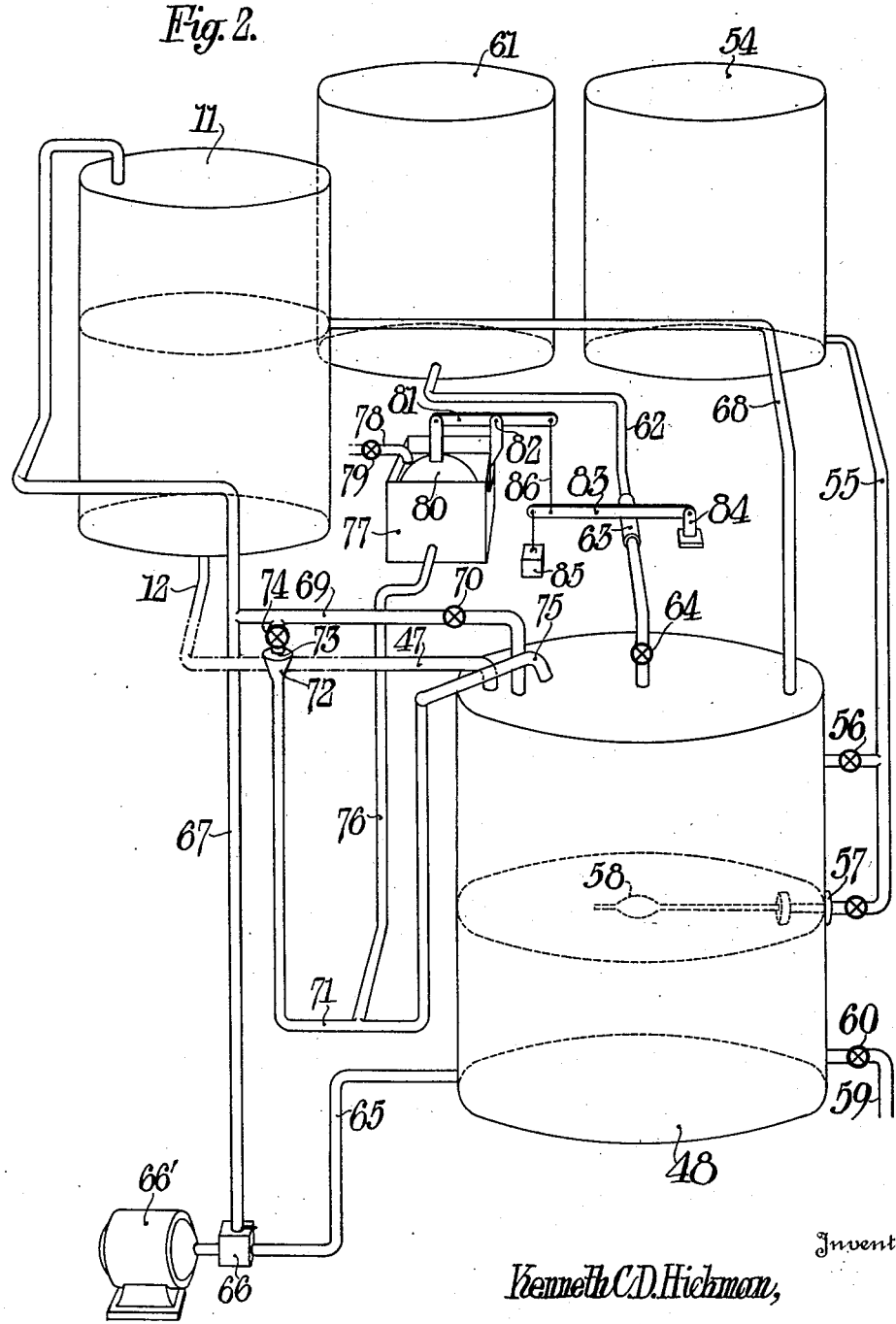

Patented Jan. 9, 1934

1,942,859

UNITED STATES PATENT OFFICE 1,942,859

LIQUID CONCENTRATION CONTROL APPARATUS

Kenneth C. D. Hickman, Rochester, N. Y., assignor to Eastman Kodak Company, Rochester, N. Y., a corporation of New York Original application June 4, 1931, Serial No. 542,053, and in Canada April 13, 1932. Divided and this application May 21, 1932. Serial No. 612,733

7 Claims. (Cl. 137—165)

The present invention relates to a liquid concentration control apparatus and more particularly to an apparatus for maintaining the concentration of the solution in a circulatory system at a substantially constant and predetermined value, being a division of my co-pending application Serial No. 542,053, filed June 4, 1931, for a Method of photographic processing.

The primary object of the invention is the provision of an apparatus for automatically maintaining the concentration of a circulating solution at a predetermined value.

Another object of the invention is the provision of an apparatus for automatically maintaining the concentration of a circulating solution at a predetermined value which may be varied.

A further object of the invention is the provision of an apparatus for automatically controlling the concentration of a photographic fixing solution which includes a liquid balance means for balancing a column of properly concentrated fixing solution against a column of water, decrease in the fixing solution concentration effecting the operation of a valve means to introduce a solution of higher concentration into the fixing solution.

Other objects of the invention will be suggested to those skilled in the photographic processing art as the description of my invention is developed hereinafter.

With these objects in view, the present invention consists in certain features of novelty in the construction, combination and arrangement of parts by which the said objects and certain other objects are effected, all as fully described with reference to the accompanying drawings, and more particularly pointed out in the appended claims.

In the drawings like reference numerals designate similar units and Fig. 1 is a diagrammatic illustration of a processing laboratory which may be operated according to my invention and which contains the apparatus suitable for the operation thereof.

Fig. 2 illustrates in perspective and to enlarged scale a circulatory system which includes the liquid concentration control apparatus of the invention.

The fixing solution contemplated throughout the disclosure of the present invention may be any standard solution which is suitable for the requirements at hand. As an example, only, the constituents of a photographic fixing bath are given below:

| | Parts |
|---|---|
| Sodium thiosulfate | 300 |
| Sodium sulfite | 10 |
| Acetic acid (or the equivalent) | 10 |
| Chrom alum | 10 |
| Water | 1,000 |

The fixing solution of desired composition is supplied to a service tank 11, which is located preferably at sufficient height above the processing tanks 10 so that solution will be supplied thereto by gravity through the supply main 12. The individual processing tanks 10 are connected to supply main 12 by pipes 13, each of which contain a regulating valve 14 and a shut-off valve 15. A by-pass 16 for the valves 14 and 15 contains a quick filling valve 17 to permit rapid flow of solution to processing tank 10 without altering the adjustment of regulating valve 14.

The fixing solution is discharged from the processing tanks to a discharge main 18 connected by individual branch pipes 19 to the processing tanks 10. One branch of pipe 19 is connected to a processing tank 10 so as to maintain the desired level of solution within tank 10. The other branch of pipe 19 is connected to dump valve 20 to the bottom of tank 10 so that the solution therein may be rapidly discharged if necessary or desired.

The discharged fixing solution is conducted by a pipe 21 to an electriclytic unit supply main 32. A plurality of electrolytic units 33 are each connected to the supply main 32 by a pair of branch pipes 34. Each of the branch pipes are connected at opposite ends of the electrolytic units 33 and contain valves 35 for regulating the supply of fixing solution or electrolyte to the individual electrolytic units 33. The electrolytic units are preferably constructed in accordance with the co-pending application of Hickman and Weyerts, Serial No. 540,621, filed May 28, 1931, for improvements in Apparatus for electroplating silver from used photographic fixing solutions. The electrolytic units 33 are provided with mechanical agitating means rotated by belt drives to pulleys 36.

The plates within the electrolytic units 33 are alternately connected in a known manner by leaders 37 to an anode bus bar 38 and by leaders 39 to a cathode bus bar 40. A source of low voltage uni-directional electrical energy is provided by a low voltage direct current generator 42 driven by a motor 41, the positive side of generator 42 being connected by a wire 43 to the anode bus bar 38, while the negative side of generator 42 is connected by a wire 44 to the cathode bus bar 40. The plating current supplied by generator 42 is controlled by regulation of a variable resistance or field rheostat 45 which is inserted in the excitation circuit for the generator. The field rheostat 45 may be manually operated to give the desired plating current or may be automatically operated to vary the plating current corresponding to the silver concentration of the fixing solution and rate of flow thereof, according to my copending application, Serial No. 540,620, filed May 28, 1931, for improvements in Automatic silver recovery control.

The desilvered fixing solution may be conducted from the center of units 33 by outlets 46 through a discharge main 47 to a tank 48. The discharged fixing solution from one or more of units 33 may be conducted to waste by pipe 49 connected to a two-way valve 50 in outlet 46. The units 33, which have solution continuously circulating therethrough, are classed or grouped as working units, while the units 33 which are adapted to have the solution therefrom discharged to waste are grouped as tailing units. The rate of flow of solution through the working units 33 is preferably more rapid than the rate of flow of solution through the tailing units 33, because the rate of silver plating in the working units is more rapid than in the tailing units and is not continued until the silver is substantially exhausted from the solution, as in the tailing units.

The desilvered fixing solution in tank 48 may be deficient in hardener which may be supplied from a hardener tank 51 through a pipe 52 leading into tank 48. The supply of hardener to tank 48 may be manually controlled by regulation of a valve 53 in pipe 52.

The description hereinafter may be more readily followed by reference to Fig. 2 which is drawn to enlarged scale. In Fig. 2, dot-dash lines between supply main 12 and discharge main 47 indicate that the solution flows through some apparatus which affects the character of the fixing solution, such as the processing tanks and the electrolytic units, which have been omitted from Fig. 2.

Since a portion of the fixing solution is preferably discharged to waste from the tailing units 33, it will be necessary to replenish the solution in tank 48 in order to maintain a constant quantity of solution in circulation through the entire apparatus. Consequently, the tank 54 is filled with replenishing solution which is merely a photographic fixing solution of proper composition. The tank 54 is connected by a pipe 55 through a manually controlled valve 56 to the tank 48 or alternatively through a float operated valve 57, which is automatically controlled by the position of float 58 within tank 48 to maintain a solution level, such as indicated by the dotted line in the drawings. If desired, solution from tank 48 may be discharged to waste through pipe 59 and valve 60.

In practice the sodium thiosulfate concentration of the solution will be diminished upon passage through the processing apparatus and desilvering in the electrolytic units 33. Therefore, a tank 61 is supplied with a solution of sodium thiosulfate which has a higher concentration than the proper or desired fixing solution. This solution of higher concentration may be conducted from tank 61 through a pipe 62 having a rubber hose 63 intermediately inserted therein and having a manually controlled valve 64.

The fixing solution is conducted from tank 48 by a pipe 65 to a pump 66 actuated by a motor 66'. The solution is discharged from pump 66 through a pipe 67 into the service tank 11. If the level of solution in service tank 11 reaches that indicated in dotted lines, the solution will overflow through pipe 68 back into tank 48.

A by-pass 69 leads from pipe 67 into tank 48. This by-pass 69 may be regulated manually by a valve 70 to control the amount of solution being returned through pipe 67 to the service tank 11. Therefore, the rate of flow of solution between tank 48 and service tank 11 will depend upon several factors, among them the capacity of pump 66, the quantity of solution being discharged from service tank 11 to processing tanks 10 and the opening of valve 70 in the by-pass 69.

The continual use of solution for processing and subsequent desilvering thereof, will result in a decrease of sodium thiosulfate concentration. The deficiency is automatically compensated for by automatically controlling the supply of strong sodium thiosulfate from tank 61 to tank 48. The automatic control for the supply of strong sodium thiosulfate comprises a balancing means which operates a valve means to control the supply of solution. The liquid balancing means comprises in part a U-tube, 71, which has a funnel-shaped end 72 under a tap 73 which leads from by-pass 69 and which may be manually controlled by a valve 74. The other end of U-tube 71 has an adjustable spout 75 which may be moved into any desired position above tank 48. Thus, it will be seen that the level of solution in the U-tube 71 will depend directly upon the position of spout 75, while the rate of flow of solution through U-tube 71 will depend upon the adjustment of valve 74. The liquid balancing means also includes a vertical pipe 76 connected at its lower end to the center of U-tube 71 and its upper end to a float box 77. The float box 77 receives an adjustable supply of water through a pipe 78 which may be regulated by valve 79. The float box 77 contains a float 80. A lever 81 fulcrumed at 82 is moved by float 80 into positions corresponding to the level of water within float box 77. A lever 83 is fulcrumed to a bracket 84 at one end and has a weight 85 attached to its free end. The free end of lever 83 is connected by a rod or wire 86 to one end of lever 81. The lever 83 is located adjacent the rubber hose 63 in pipe 62, and weight 85 is heavy enough so that lever 83 will kink hose 63 to prevent the flow of strong sodium thiosulfate from tank 61 to tank 48 but still light enough to be raised by the weight of float 80 when the liquid level in float box 77 decreases.

If solution of proper concentration is passing through U-tube 71, the head of water in pipe 76 and float box 77 which is balanced by the column of solution in one leg of U-tube 71, will be of such a level that lever 83 closes off the supply of more concentrated sodium thiosulfate from tank 61. The quantity of solution flowing through the other leg of U-tube 71 will depend upon the adjustment of valve 74 and valve 79 for the water supply, that is, both water and solution will be discharged from spout 75. A decrease in the sodium thiosulfate concentration of the solution being circulated between tanks 48 and 11 will decrease the weight of solution in one leg of U-tube 71. The head or column of water in float box 77 and pipe 76 will now predominate, and more water will flow through spout 75 to decrease the water level in float box 77. The float 80 will lower with the decrease in water level to raise lever 83 and allow a quantity of more concentrated solution of sodium thiosulfate to flow into tank 48 from tank 61.

It should be noted that the spout 75 may be adjusted to alter the concentration of solution, which will be maintained by this automatic control. If spout 75 is raised, a greater column of solution will be maintained in U-tube 71 and it will require a greater head of water or higher level in float box 77 to balance the same. A larger decrease in solution concentration will be necessary before the float 80 will drop to such a level that lever 83 will be raised. Conversely, if spout 75 is lowered, the decrease in water level necessary to raise lever 83 will be less. Therefore, lowering of spout 75 will increase, and raising of spout 75 will decrease the concentration of solution which is automatically maintained in tank 48.

The operation of the entire laboratory layout according to my invention will now be described:

The fixing solution may originally be supplied to service tank 11 to maintain a regulated flow through processing tanks 10, this apparatus may properly be included in the generic term "processing means". The discharge from processing tanks 10 is conducted through the electrolytic units 33 in a manner already particularly described. Some of the solution is circulated through the electrolytic units 33 into tank 48 from where it is returned to the service tank 11. A portion of the solution is bled off to the tailing electrolytic units from whence it is preferably discharged to waste. The tank 48, pump 66 and circulating pipes of the apparatus include a circulating means which is adapted to recirculate solution through the processing tanks and electrolytic units as well as between the tank 48 and service tank 11. The operation of a balancing means for automatically maintaining a definite fixing solution concentration has already been explained with respect to the particular description of that apparatus.

Since many modifications of my invention are possible, the present disclosure is to be construed in an illustrative and not in a limiting sense, the scope of my invention being particularly defined in the appended claims.

Having now particularly described my invention what I claim as new and desire to secure by Letters Patent of the United States is:

1. In a control apparatus for regulating the concentration of a solution, the combination with a circulatory system adapted to contain said solution and a valve means for controlling the admission of a concentrated solution into said circulatory system, of a liquid balance means adapted to maintain a dynamic balance between a moving column of a standard solution and a moving column of solution of desired concentration and a float means adapted to be operated to open said valve means upon a decrease in concentration of the solution in said circulatory system.

2. In a control apparatus for regulating the concentration of a solution, the combination with a circulatory system adapted to contain said solution and a valve means for controlling the admission of a concentrated solution into said circulatory system, of a liquid balance means including a U-tube for circulation of said solution and adapted to contain in one leg thereof a column of the solution in said system and including a conduit connected to said U-tube and adapted to contain a moving column of standard solution equal in weight to the weight of a column of solution of desired concentration, and a float means movable to positions corresponding to the height of said column of standard solution and adapted to open said valve means when the weight of said column of standard solution is greater than the weight of the circulating solution in said leg of the U-tube.

3. In a control apparatus for regulating the concentration of a solution, the combination with a circulatory system adapted to contain said solution and a valve means for controlling the admission of a concentrated solution into said circulatory system, of a U-tube adapted to contain in one leg thereof a column of the solution in said system and having an adjustable spout on the other leg to regulate the height of the columns of solution in each leg, a conduit intermediately connected to said U-tube and adapted to support a column of standard solution equal in weight to the weight of a column of solution of desired concentration, and a float means connected to said conduit and operated to open said valve means when the weight of said column of standard solution is greater than the weight of the solution passing through the system and in one leg of said U-tube.

4. In a solution concentration control apparatus, the combination with a tank adapted to contain a solution, of a balancing means for conducting solution to said tank and adapted to balance a column of water against a column of solution having the desired concentration and to lower the level of the water column upon decrease of the concentration of the solution, and valve means opened by the decrease in the level of the water column to admit the necessary amount of solution of higher concentration into the solution whereby the weight of the solution column in the balancing means is increased to restore equilibrium thereto.

5. In a solution concentration control apparatus, the combination with a tank adapted to contain a desilvered used photographic fixing solution, of a balancing means for conducting solution to said tank and adapted to balance a column of water against a column of solution having proper concentration and to lower the level of the water column upon decrease in concentration of the solution, and float operated control means movable to positions corresponding to the height of said water column and adapted to admit a controlled quantity of concentrated sodium thiosulfate into the solution when the weight of the solution column in the balancing means has decreased below a predetermined value.

6. In a solution concentration control apparatus, the combination with a tank adapted to contain the solution, of a U-tube adapted to conduct said solution to said tank and to contain a column of a solution of desired concentration, a pipe connected to said U-tube and adapted to contain a column of water balancing the solution in said U-tube, a float movable to positions corresponding to the height of said water column and a valve operated by said float and adapted to control the supply of a more concentrated solution to the solution.

7. In a solution concentration control apparatus, the combination with a tank adapted to contain the solution, of a U-tube for conducting solution to said tank and adapted to contain solution of proper concentration, a pipe connected to the bottom of said U-tube, a float box connected to the top of said pipe and adapted to contain water to a level balancing the solution in said U-tube, and a valve operated by a decrease in the water level and adapted to admit a controlled quantity of higher concentration solution to the solution.

KENNETH C. D. HICKMAN.